United States Patent
Wang (10) Patent No.: US 11,860,324 B2
(45) Date of Patent: Jan. 2, 2024

(54) SYSTEM AND METHOD FOR 3D SEISMIC VELOCITY ESTIMATION

(71) Applicant: Chevron U.S.A. Inc., San Ramon, CA (US)

(72) Inventor: Enning Wang, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 170 days.

(21) Appl. No.: 17/369,825

(22) Filed: Jul. 7, 2021

(65) Prior Publication Data

US 2022/0018981 A1     Jan. 20, 2022

Related U.S. Application Data (60) Provisional application No. 63/052,943, filed on Jul. 16, 2020.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/614* (2013.01)

(58) Field of Classification Search
CPC .. G01V 1/282; G01V 1/303; G01V 2210/614; G01V 2210/6222

See application file for complete search history.

(56) References Cited

U.S. PATENT DOCUMENTS

| | | | |
|---|---|---|---|
| 2013/0125057 A1* | 5/2013 | Kashik | G06F 16/904 |
| | | | 715/852 |
| 2015/0046457 A1* | 2/2015 | Weinstein | G06F 16/287 |
| | | | 707/737 |
| 2019/0064389 A1* | 2/2019 | Denli | G01V 99/005 |
| 2020/0400847 A1* | 12/2020 | Bakulin | G01V 1/32 |
| 2021/0374465 A1* | 12/2021 | Aharchaou | G06F 18/24133 |
| 2022/0203026 A1* | 6/2022 | Fischer | G16H 50/20 |
| 2022/0236436 A1* | 7/2022 | Li | G01V 1/368 |

FOREIGN PATENT DOCUMENTS

WO     WO-2019010253 A1 *    1/2019    ............ G01V 1/005

OTHER PUBLICATIONS

Mauricio Araya-Polo et al., "Deep Learning-Driven Velocity Model Building Workflow," The Leading Edge, Nov. 2019, vol. 38, No. 11, pp. 872a1-872a9, Society of Exploration Geophysicists (SEG).

Gabriel Fabien-Ouellet et al., "Seismic Velocity Estimation: A deep Recurrent Neural-Network Approach," Geophysics, vol. 85, No. 1, Jan.-Feb. 2020, pp. U21-U29, Society of Exploration Geophysicists (SEG).

(Continued)

*Primary Examiner* — John E Breene
*Assistant Examiner* — Yaritza H Perez Bermudez
(74) *Attorney, Agent, or Firm* — Marie L. Clapp (57) ABSTRACT

A method is described for estimating seismic velocity from seismic data by training a neural network using a subset of a seismic dataset and the velocity model; estimating a second velocity model using the neural network and a second subset of the seismic dataset; and displaying the second velocity model on a graphical user interface. The method may be executed by a computer system.

13 Claims, 11 Drawing Sheets

(56) References Cited

OTHER PUBLICATIONS

Yue Wu et al., "InversionNet": A Real-Time and Accurate Full Waveform Inversion with CNNs and Continuous CRFs, IEEE Transactions on Computational Imaging, Jan. 5, 2019, 14 pgs.
Fangshu Yang et al., "Deep-Learning Inversion: A Next-Generation Seismic Velocity Model Building Method," Geophysics, vol. 84, No. 4, Jul.-Aug. 2019, pp. R583-R599, Society of Exploration Geophysicists (SEG).
Zhongping Zhang et al., "Data-Driven Seismic Waveform Inversion: A Study on the Robustness and Generalization," IEEE Transactions on Geoscience and Remote Sensing, Institute of Electrical and Electronics Engineers (IEEE), vol. 58, No. 10, pp.
Adler Amir, et al., "Deep Learning for Seismic Inverse Problems: Toward the Acceleration of Geophysical Analysis Workflows", IEEE Signal Proces Sing Magazine, vol. 38, No. 2, Feb. 25, 2021, pp. 89-119, XP011840421.
Gunter Röth, et al., "Inversion of Seismic Waveforms Using Neural Networks", International Journal of Earth Sciences, Oct. 29, 1992, pp. 788-791, XP055474968, Berlin/Heidelberg ISSN: 1437-3254.
PCT International Search Report dated Sep. 16, 2021, issued in International Application No. PCT/IB21/056074, filed on Jul. 7, 2021, 13 pages.
Wenlong Wang et al., "Velocity model building with a modified fully convolutional network", SEG Technical Program Expanded Abstracts, Aug. 27, 2018, pp. 2086-2090, XP055759393.
Wenlong Wang et al.: "VMB-Net: A deep learning network for velocity model building in a cross-well acquisition geometry", SEG Technical Program Expanded Abstracts, Aug. 10, 2019, pp. 2569-2573, XP55838809.
Lucas Mosser et al., "Rapid Seismic Domain Transfer: Seismic Velocity Inversion and Modeling Using Deep Generative Neural Networks," Extended abstract submitted to EAGE 2018, 5 pages, 3 figures, XP080881234.

\* cited by examiner

SYSTEM AND METHOD FOR 3D SEISMIC VELOCITY ESTIMATION

CROSS-REFERENCE TO RELATED APPLICATIONS

This application claims the benefit of U.S. Provisional Patent Application No. 63/052,943, filed Jul. 16, 2020.

TECHNICAL FIELD

The disclosed embodiments relate generally to techniques for seismic velocity estimation and, in particular, to a method of estimating seismic velocity using a trained model.

BACKGROUND

Seismic exploration involves surveying subterranean geological media for hydrocarbon deposits. A survey typically involves deploying seismic sources and seismic sensors at known locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic velocity is a spatially varying attribute that measures the speed seismic waves travel in the Earth. The compressional or P-wave velocity is a critical input to seismic imaging that migrates signals in raw seismic traces to their original spatial locations to construct a 3D subsurface image. Subsurface velocity can be estimated from seismic surveys acquired from the surface. The main algorithms are seismic tomography and Full Waveform Inversion (FWI), which start from an initial model, simulate ray or wave propagation and derive gradients from data misfit to update the model. These conventional processes are performed iteratively until the model converges.

To reduce the long cycle time and excessive computational cost associated with forward simulation, alternative data-driven algorithms have been proposed in recent years to predict velocity directly from raw seismic data. This class of algorithms leverage developments in computer vision and applied Deep Learning (DL) to encode raw data in a latent space and decode to generate a velocity model in one single step. However, due to constraints from data complexity and computational cost, DL-based velocity modeling studies in literature only train on data in two-dimensional space and predict 2D velocity models. In addition, these models are trained on 2D synthetic data that were simulated with simplified 2D layered models and are mainly of theoretical interest rather than practical use.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved seismic velocity estimation so that seismic imaging will allow better seismic interpretation of potential hydrocarbon reservoirs.

SUMMARY

In accordance with some embodiments, a method of estimating seismic velocity from seismic data may include receiving a 5D seismic dataset representative of a subsurface volume of interest and a 3D velocity model; preparing a subset of the 5D seismic dataset and a subset of the 3D velocity model to generate a training dataset; training a model using the training dataset to generate a trained model; and storing the trained model in the memory or a non-transitory computer readable storage medium. In an embodiment, the subset of the 5D seismic dataset includes regularizing the subset of the 5D seismic dataset to generate a regularized subset; decimating the regularized subset to generate a decimated subset; mapping shots and seismic traces of the decimated subset onto a uniform grid; and forming shot clusters based on the shots and seismic traces on the uniform grid to generate the training seismic dataset. In an embodiment, the subset of the 3D velocity model is selected based on the shot clusters' aperture. In an embodiment, the model may be a 3D Encoder-Decoder or a Generative Adversarial Network. The method may include obtaining a trained model from computer memory or a non-transitory computer readable storage medium; receiving a 5D seismic dataset; estimating a predicted velocity model using the trained model and a subset of the 5D seismic dataset; and displaying the predicted velocity model on a graphical user interface. In an embodiment, the estimating the predicted velocity model is done for a plurality of subsets of the 5D seismic dataset and a plurality of subsets of the 3D velocity model; storing the predicted velocity models to a set of estimated velocity models; and concatenating the set of estimated velocity models to generate a whole 3D velocity model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic velocity estimation. Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

In principle, starting from seismic shot records, a Deep Neural Network can be trained to predict all input attributes to seismic forward simulation, including both P and S (shear) wave velocities, density and anisotropy parameters epsilon and delta, etc. Tradeoffs usually exist among these parameters which makes it difficult to resolve individual attributes independently without additional information/measurements beyond seismic. The main objective of the present invention is to predict P-wave velocity that seismic data are most sensitive to, and possibly the coupling of P-wave velocity with anisotropy parameters as the inputs to seismic imaging.

In exploration and appraisal surveys, 5-dimensional data (shot X, Y coordinates, receiver cable, channel and time) are acquired for 3D velocity modeling and imaging. The present invention addresses the practical obstacles in training Deep Neural Networks (DNN) on 5D field data and predicting a realistic 3D velocity model; this is not meant to be limiting, any machine-learning algorithm may be used. An embodiment takes multiple shot records, each with 3 dimensions of cable, channel and time as training features and a block of velocity within the shot-receiver coverage of the shot group as the training label. The DNN learns the mapping from shot records to a block of underlying velocity model.

Figure 1:
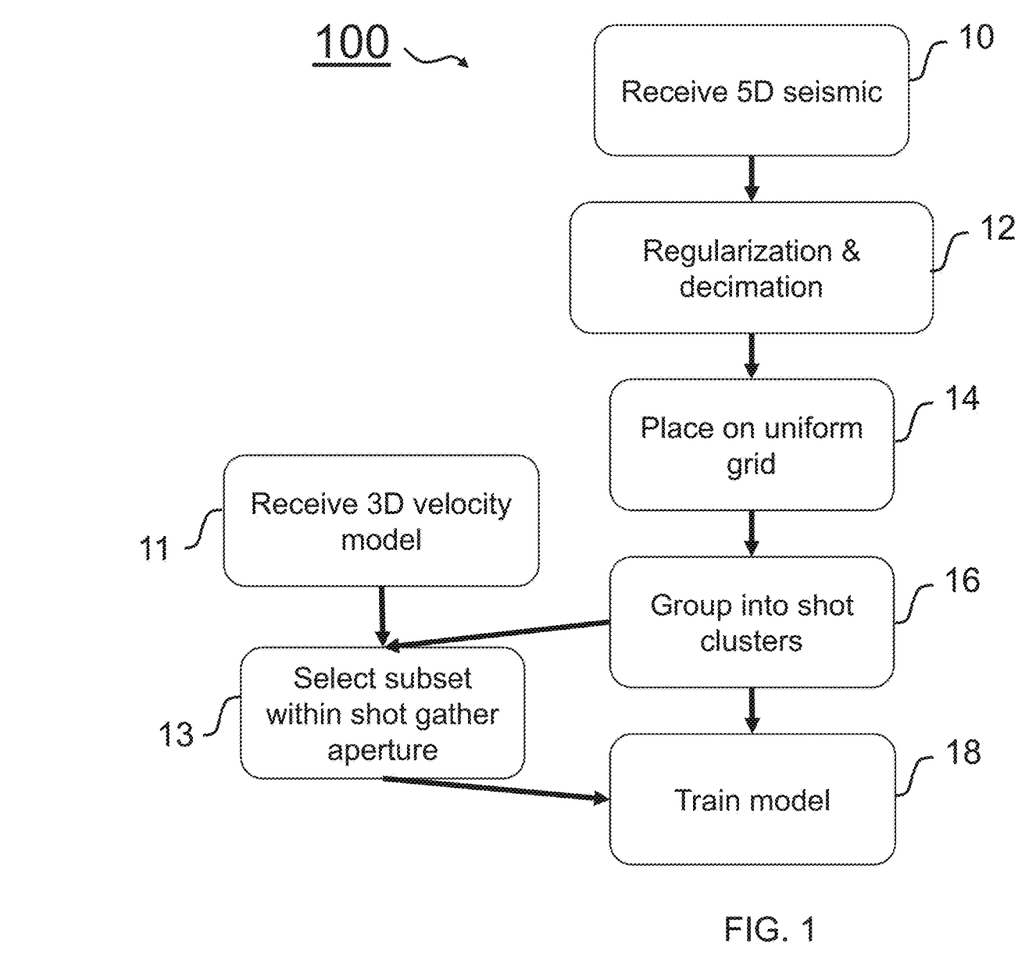
FIG. 1 illustrates a flowchart of a method for training a model for seismic velocity estimation, in accordance with some embodiments.

FIG. 1 illustrates a flowchart for method 100 that will train a model for predicting a 3D velocity model from 5D seismic data. As explained above, the method receives 5D seismic data at operation 10. To train the model at operation 18, the 5D seismic data must be prepared by operations 12, 14, and 16, which will be described below. Some considerations include resolution versus scale and noise interference. Additionally, considerations about neural architecture designs, compute challenges, and running inference and testing on field data will be discussed.

The quantity and variety in seismic shot records, the geology and salt geometry of the target velocity model all contribute to the performance of the trained model beyond the training set. A small number of shot groups (~1000) configured as training features and their corresponding velocity blocks might have a negative impact on the robustness of the trained model. An ideal training dataset can be selected from multiple field datasets with tens of thousands of shot groups and accurately defined velocity models. Alternatively, synthetic data simulated from perturbed or randomly generated velocity models can also be used as training data, with the caveat that the discrepancy between synthetic seismic forward modeling and the real physics behind wave propagation may lead to prediction accuracy degradation.

Since the features from which a velocity prediction model extracts information are seismic shot records, and marine and land surveys have a wide variety of acquisition patterns, it is highly possible that a universal model cannot handle all types of seismic surveys as inputs. One example for differentiating data collection and organization based on survey type is between a wide azimuth survey (WAZ) that shoots on regular grids with rectangular receiver patterns and Coil shooting where vessels shoot in continuous circles. The example dataset in FIGS. 2-10 (the SEAM-I dataset) simulates marine WAZ surveys that feature regular distribution of shots, traces and reasonable azimuthal coverage. Other types of surveys: Narrow Azimuth (NAZ) or Coil either has poor azimuthal coverage or need to be pre-processed appropriately by regularizing shots and traces before feeding to a Deep Neural Network or other model. It is possible that any data limitation (maximum offset, azimuthal coverage, etc.) with negative impacts on physics-based methods for velocity estimation may degrade the Deep Learning results as well.

The SEAM-I synthetic data used in the example was modeled with acoustic assumption and free surface multiples. Training a Deep Learning model does not make any assumptions about the property of the medium or the underlying physics for seismic wave propagation. For field applications, to avoid synthetic modeling errors a new Deep Learning model can be simply trained on field datasets. The presence of free surface multiples may interfere with velocity prediction, ideally in field shot preparation de-multiple can be applied first to remove the uncertainty. In general subsalt velocities are more difficult to estimate as the later arrivals in seismic records beneath salt bodies are weak and contaminated by damaging multiple reflections. Neighboring shots with larger shot-to-image distance may offer additional information to better resolve subsalt structures.

When training data contains multiple field surveys, it is necessary to pre-process seismic traces prior to feeding to a Deep Neural Network. One reasonable choice of training features can be the intermediate processing outputs prior to running migration, with statics applied so that receivers are at the sea surface, various interfering noise attenuated, multiples eliminated, shot cluster grouped, traces within shots interpolated and regularized, and each survey normalized to have equivalent weights in gradient updates. The training label-velocity model can be the full salt model out of a conventional Tomography workflow, or a Full Waveform Inversion (FWI) model.

Figure 2:
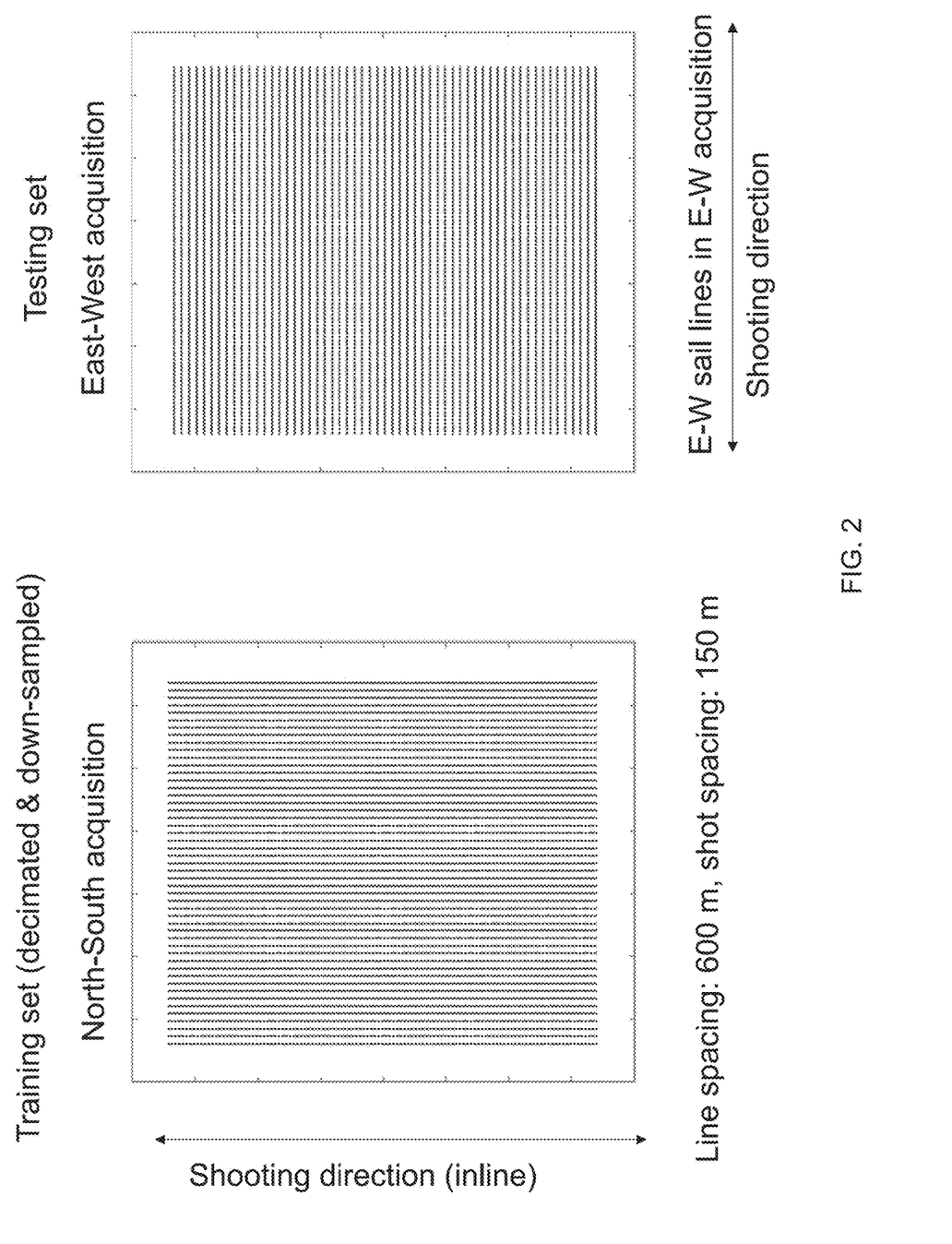
FIG. 2 demonstrates a step of a method for training a model for seismic velocity estimation, in accordance with some embodiments.
Figure 3:
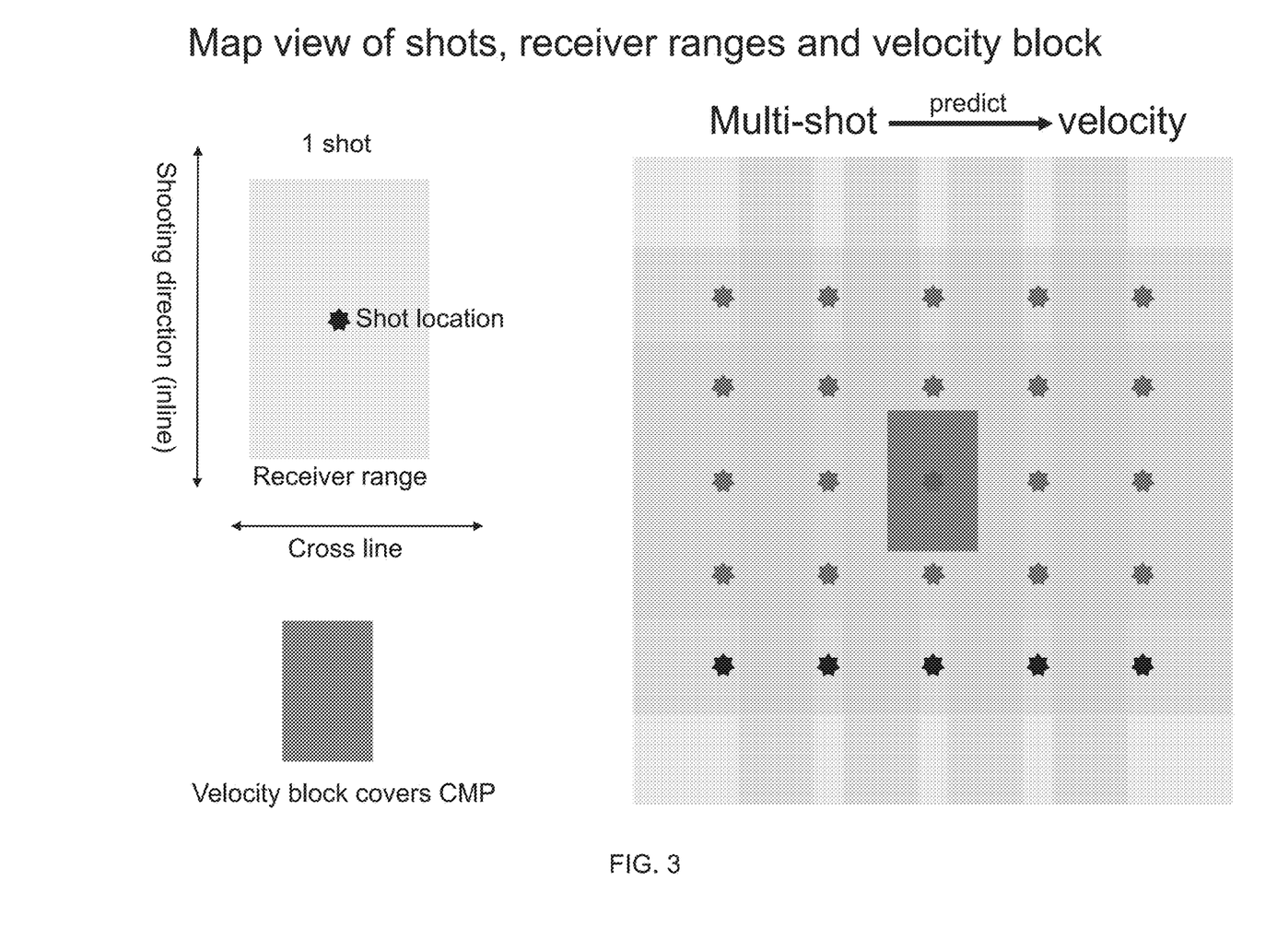
FIG. 3 demonstrates a step of a method for training a model for seismic velocity estimation, in accordance with some embodiments.

As shown in FIG. 2, the acquisition of this example SEAM-I shot has 70 cables and each cable has 661 channels. Referring again to FIG. 1, operation 12 seeks to regularize and decimate the dataset and operation 14 places the shots and traces on a uniform grid. As seen in FIG. 2, for this example the method decimates the traces along cables by a factor of 4 leaving only 166 channels so that trace spacing is 120 m both along and across cables. Different from field WAZ surveys, a shot in SEAM-I is located right in the middle of the receiver range, which is 19830 meters long in the inline direction and 8400 meters wide in the crossline direction. When multiple shots are used as input features, the velocity block to be predicted covers a box occupying the central 25% of the receiver range of the central shot (e.g., shot #13 in a 5×5 shot cluster), as demonstrated in FIG. 3. Referring again to FIG. 1, a 3D velocity model is received at operation 11.

Figure 4:
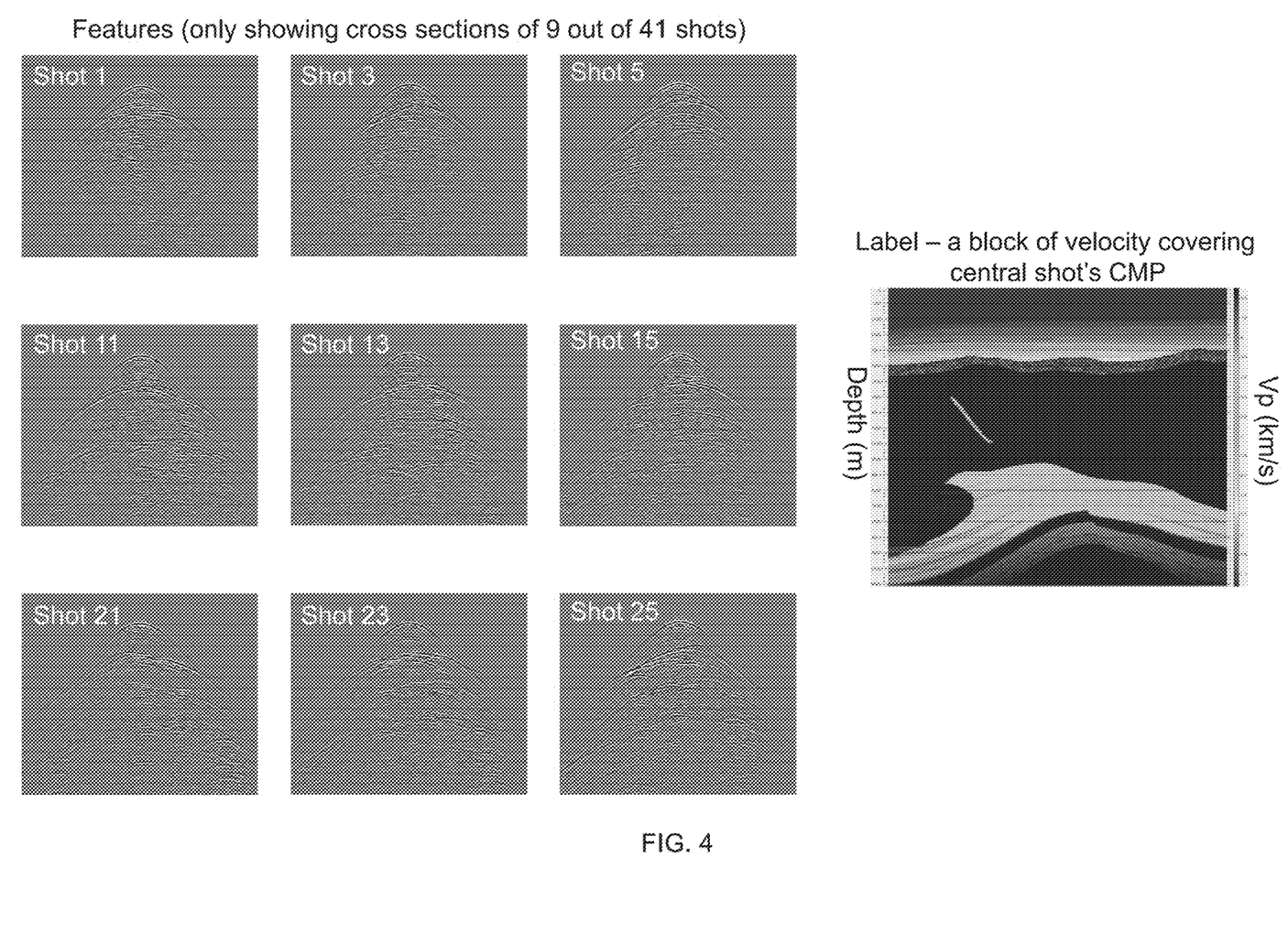
FIG. 4 demonstrates a step of a method for training a model for seismic velocity estimation, in accordance with some embodiments.

With the size of a velocity block fixed, the number of shots in the input features and the inter-shot distances define the aperture to illuminate the target velocity and these shots are grouped into shot clusters (operation 16). With more information and constraints, larger aperture and multiple contributing shots lead to more accurate and stable predictions. The sail line spacing in SEAM-I is 600 m and on each sail line, the shot spacing is 150 m. To maintain equal shot spacing in both inline and crossline directions, the original shots with spacing of 150 m on a sail line were decimated by a factor of 4 to reach the same spacing of 600 m. In the example, shots in a group are arranged by "offset" with a central shot and a series of boxes of different sizes with 8 shots uniformly distributed on the 4 sides and 4 corners. The shots in the example are on five boxes of 1.2 km, 2.4 km, 4.8 km, 9.6 km and 14.4 km so that the biggest box defines an area of 7.2 km aperture (half of 14.4 km). The shot gather aperture is used to select a subset of the velocity model that is within the shot gather aperture (operation 13). These choices can be further optimized based on the survey type, geological environment and the desired resolution of the output velocity model. FIG. 4 shows a 2D slice of a velocity block and the associated shots in the shot gather.

For each seismic trace, the sampling rate in time and maximum trace length are related to the resolution in shallow sediments and the maximum depth in the output velocity model, respectively. To save computational cost and GPU memory for multi-shot input features, the traces in the example have been down sampled by a factor of 4 from 8 milliseconds to 32 milliseconds. The coarse sampling rate leads to blurred details in shallow sediments but can be improved with higher sampling rates (e.g., 16 or 8 ms). Trace length as the input to model is 13 seconds, long enough to encompass signals relevant to the deepest section of the output velocity block (~13 km). With the tradeoff between scale and resolution, multiple Deep Learning models can be trained on data of different maximum trace lengths, sampling rates and output velocity blocks of various grid sizes. Lateral resolution in the model may also depend on the shot and trace spacing in the input features. When training on field surveys, training data specifications should be thoroughly tested and optimized.

To augment data and improve model robustness, both the training features and labels were augmented via horizontal flipping in both the E-W and N-S directions. Since velocity predictions should not be dependent on the absolute amplitudes of traces and the existence of random noise in shots, random Gaussian noise was added to the synthetic shots and the training features were scaled by a random scalar before ingested by the network.

After the training dataset has been prepared, it is used to train a model (operation 18). Although the present example describes a 3D Encoder-Decoder architecture in detail, any supervised learning approach may be used.

Figure 5:
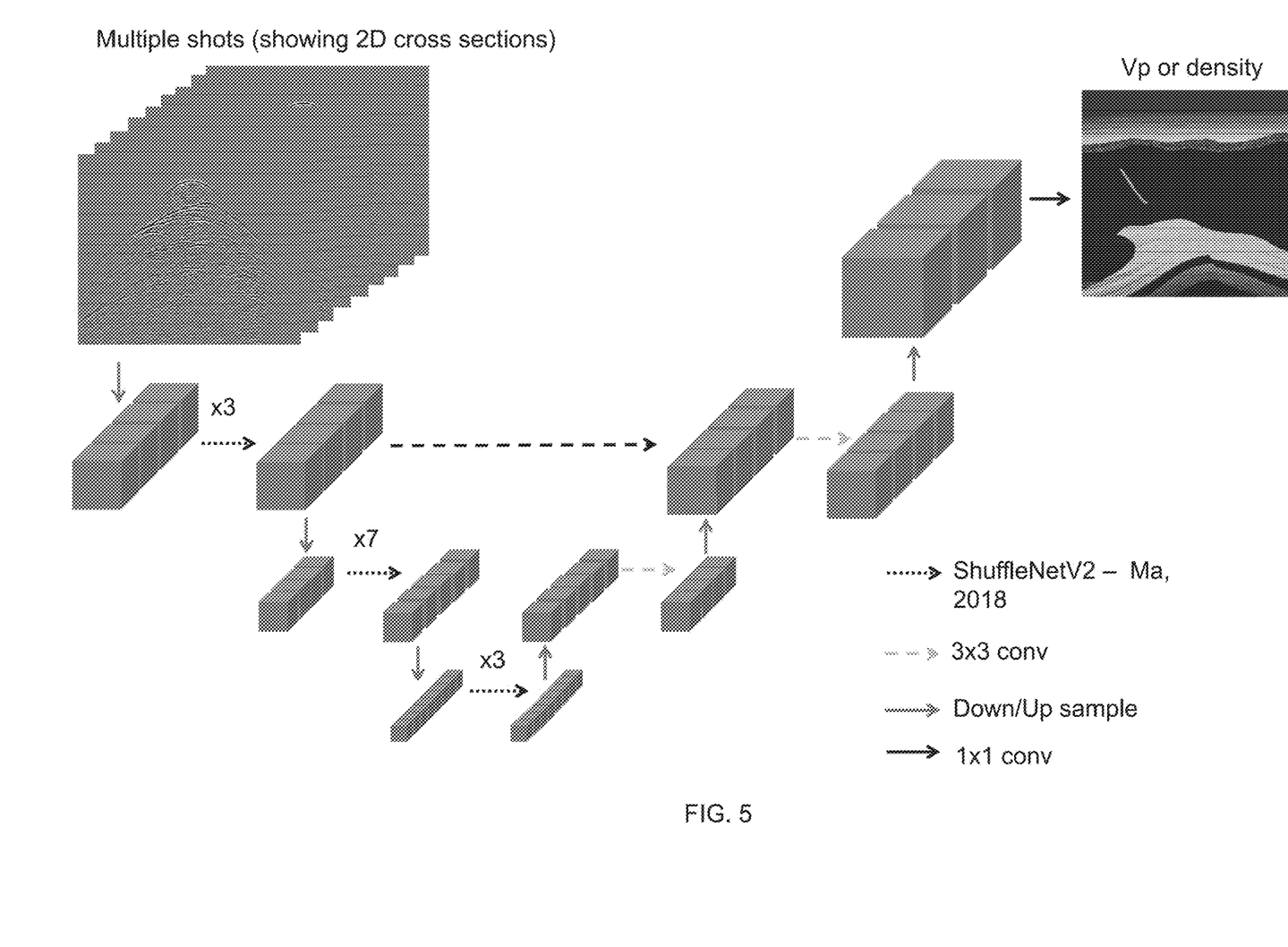
FIG. 5 illustrates an example of a model architecture, in accordance with some embodiments.

FIG. 5 illustrates an example 3D Encoder-Decoder architecture. Multiple 3D shots each with a cable, channel and time dimension are treated as multiple input feature channels of the network. A different way for data ingestion is to treat common offset & azimuth sectors/tiles as input features, or multiple calculated 4D semblance that are more directly related to velocity. In the encoder, a stem layer and three ShuffleNet v2 blocks (a mobile architecture leveraging channel shuffle and depth-wise convolutions) each perform a down sampling operation by a factor of two so that the latent space has a resolution of $\frac{1}{16}$ of the input in all three spatial dimensions. The outputs from each layer or block have increased number of features when resolution halves. ShuffleNet v2 is a mobile architecture optimized for computational load and memory footprint, with which the saved memory helps ingest multiple 3D shot volumes within the memory budget of a single GPU. In the decoder, each of the four up sampling operations consists of a deconvolution layer followed by a regular convolution. The input to the final 1×1 convolution was cropped before the feature maps were reduced to one for generating an output velocity block. In the network, bias in convolutions and squeeze-excitation layers were applied to increase network capacity. The test results show that the architecture effectively learns the mapping from shot gathers to velocities.

Figure 6:
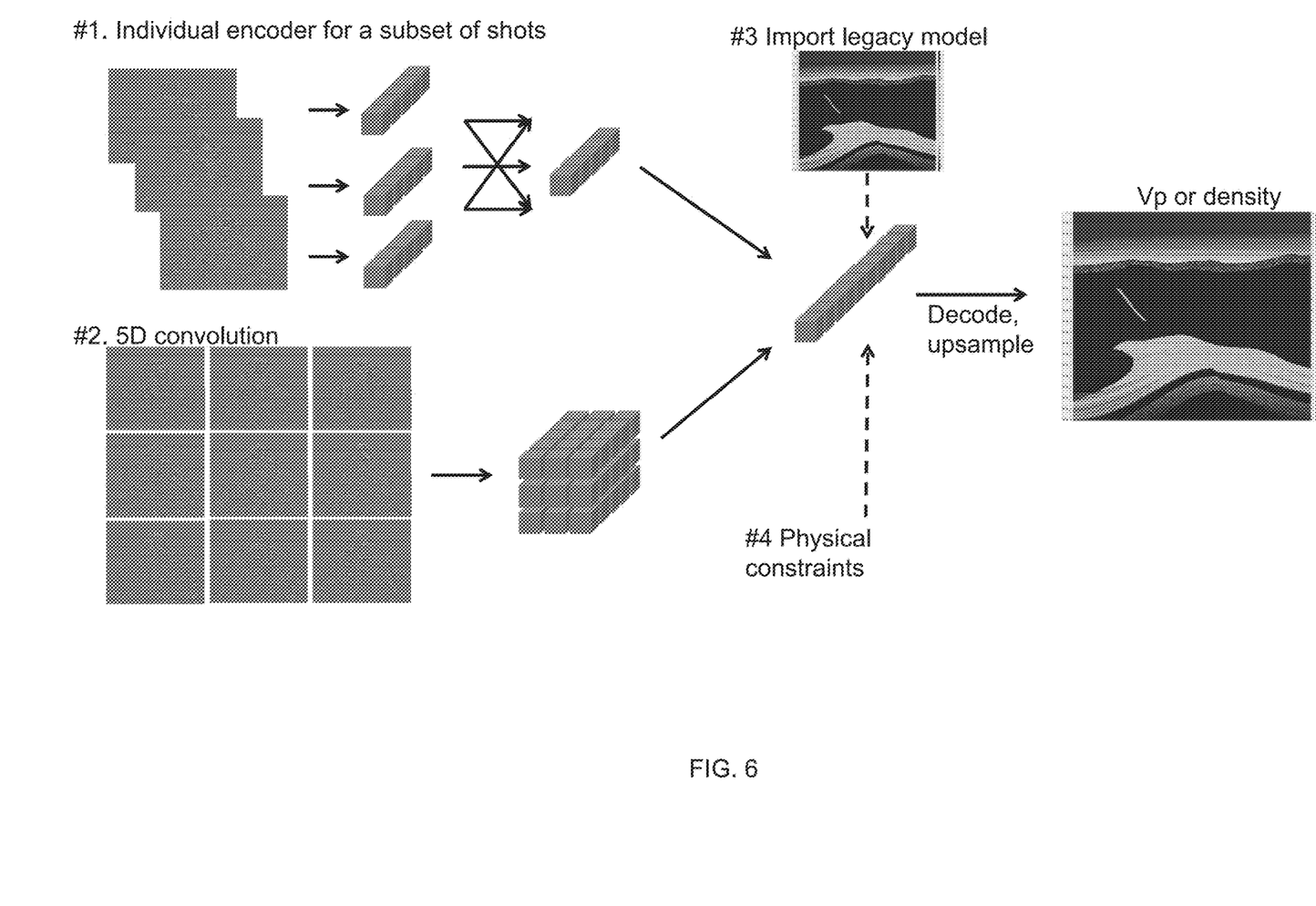
FIG. 6 illustrates an example of a model architecture, in accordance with some embodiments.
Figure 7:
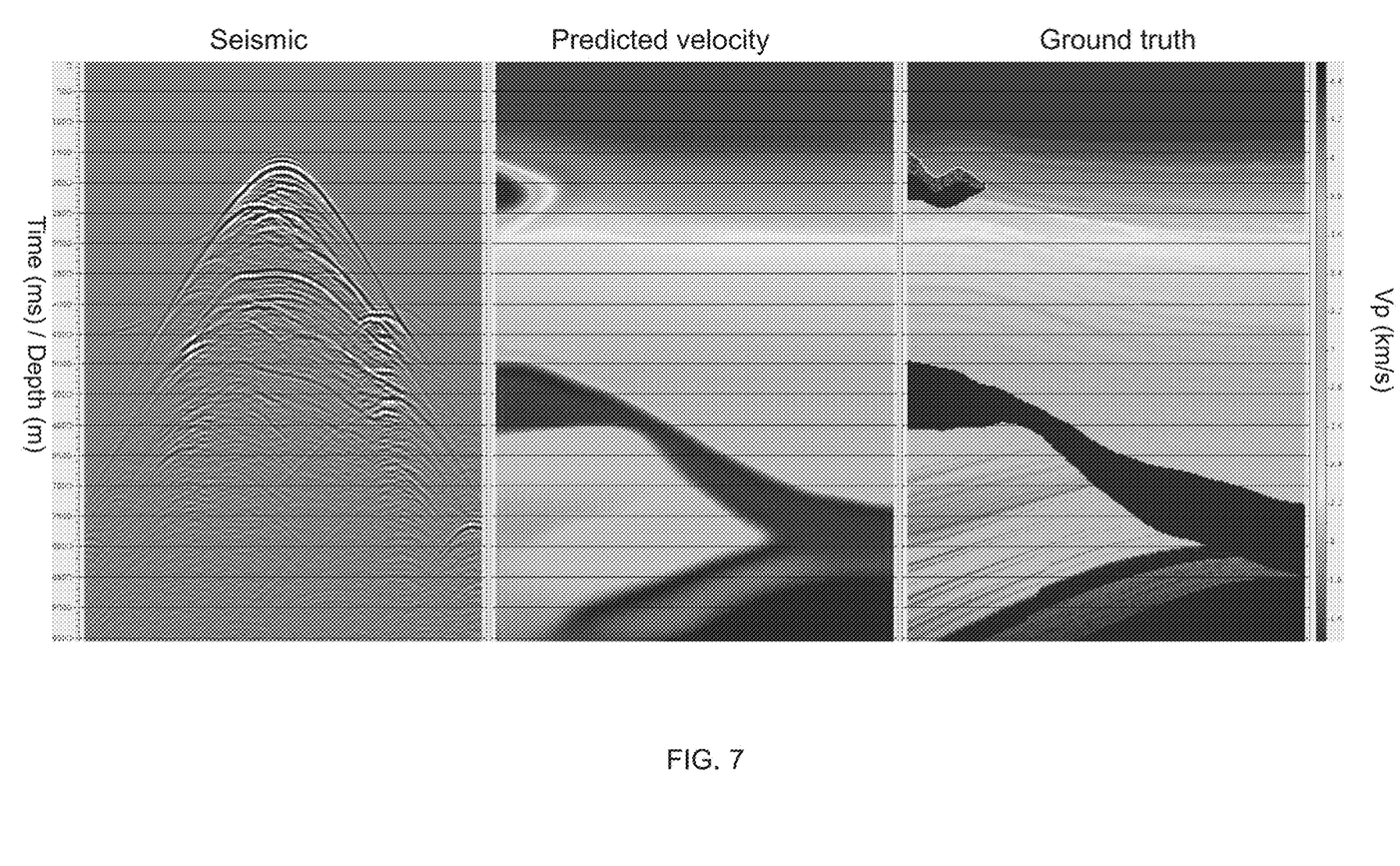
FIG. 7 demonstrates results of the present invention, in accordance with some embodiments.
Figure 8:
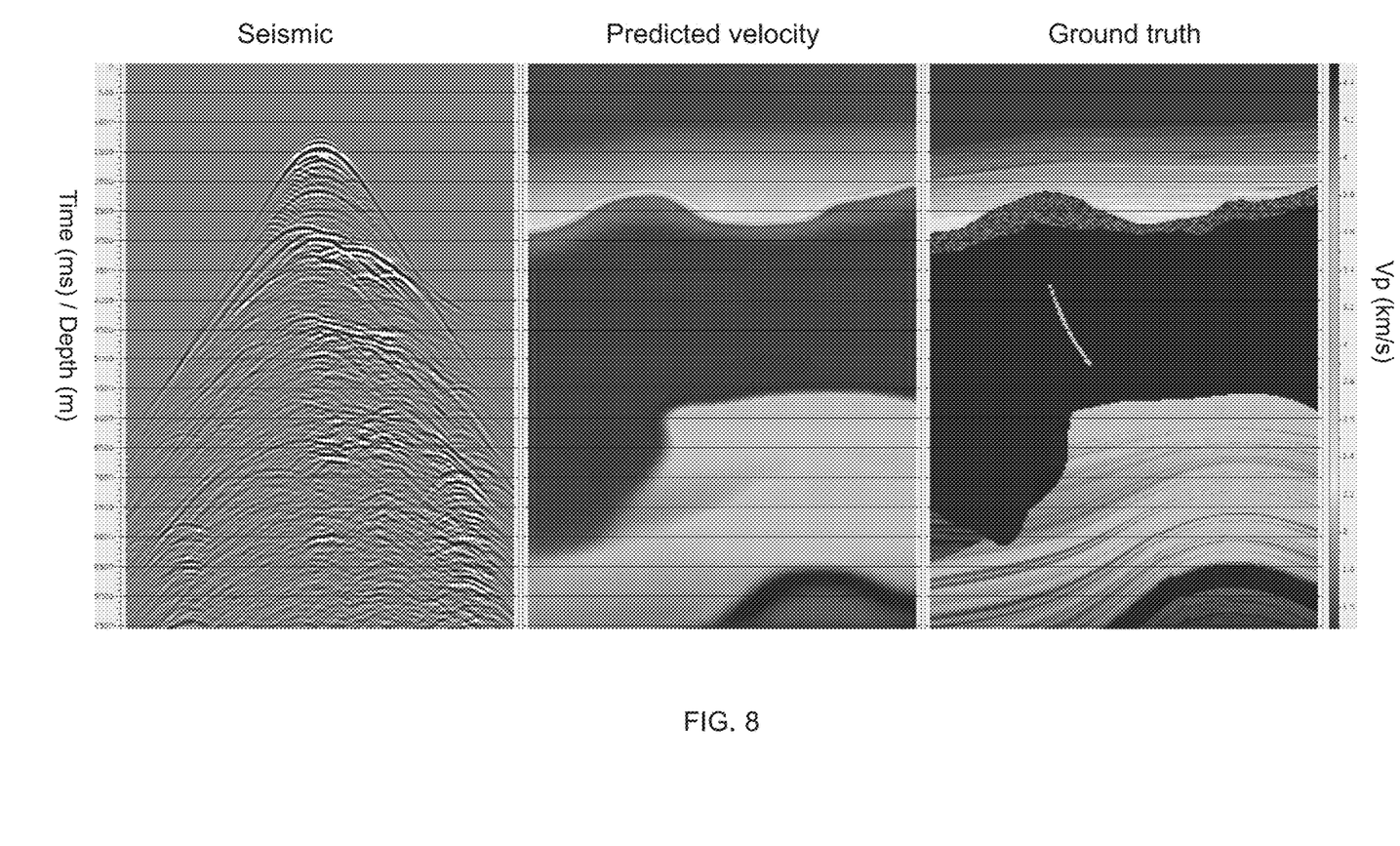
FIG. 8 demonstrates results of the present invention, in accordance with some embodiments.
Figure 9:
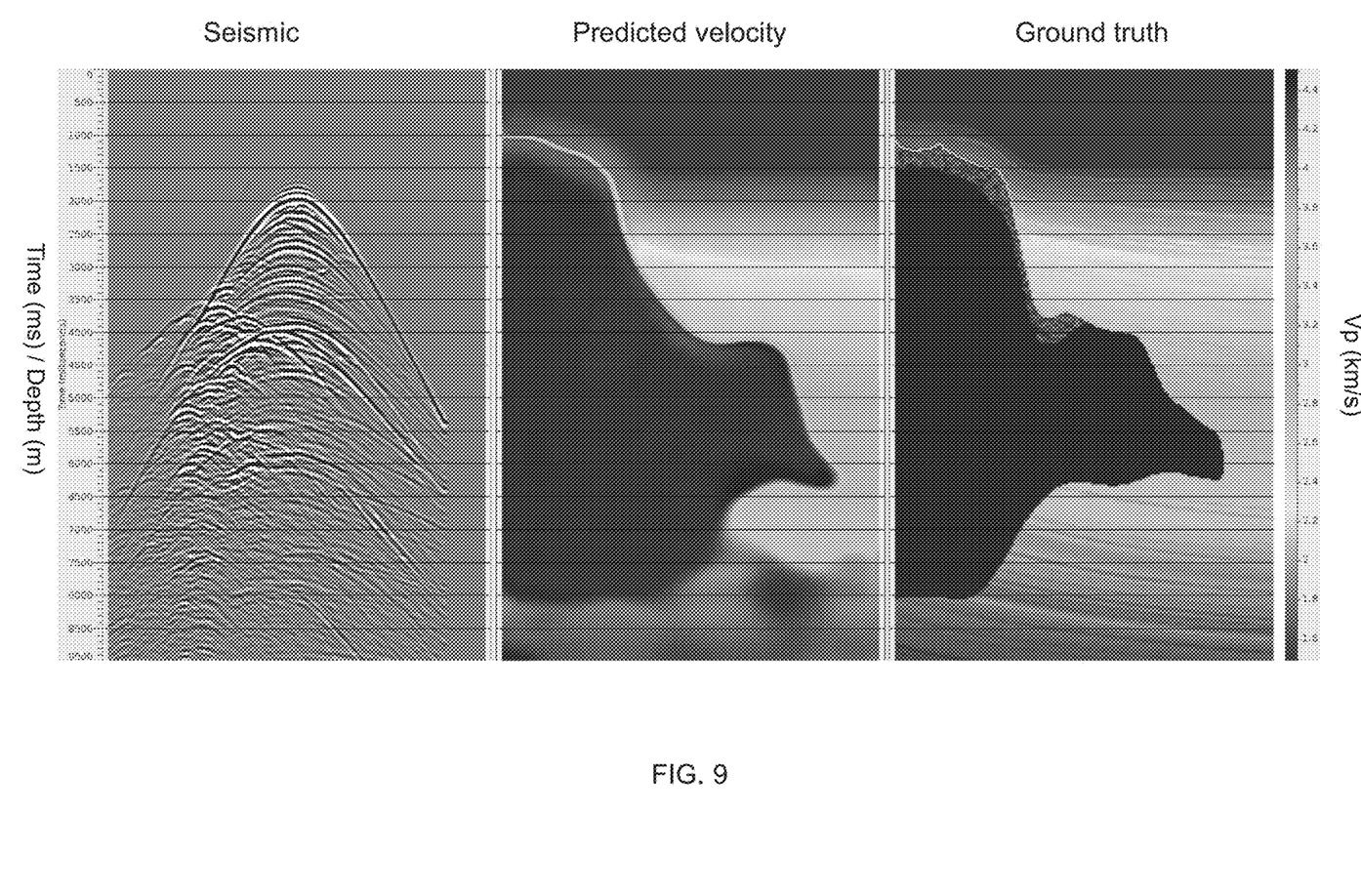
FIG. 9 demonstrates results of the present invention, in accordance with some embodiments.
Figure 10:
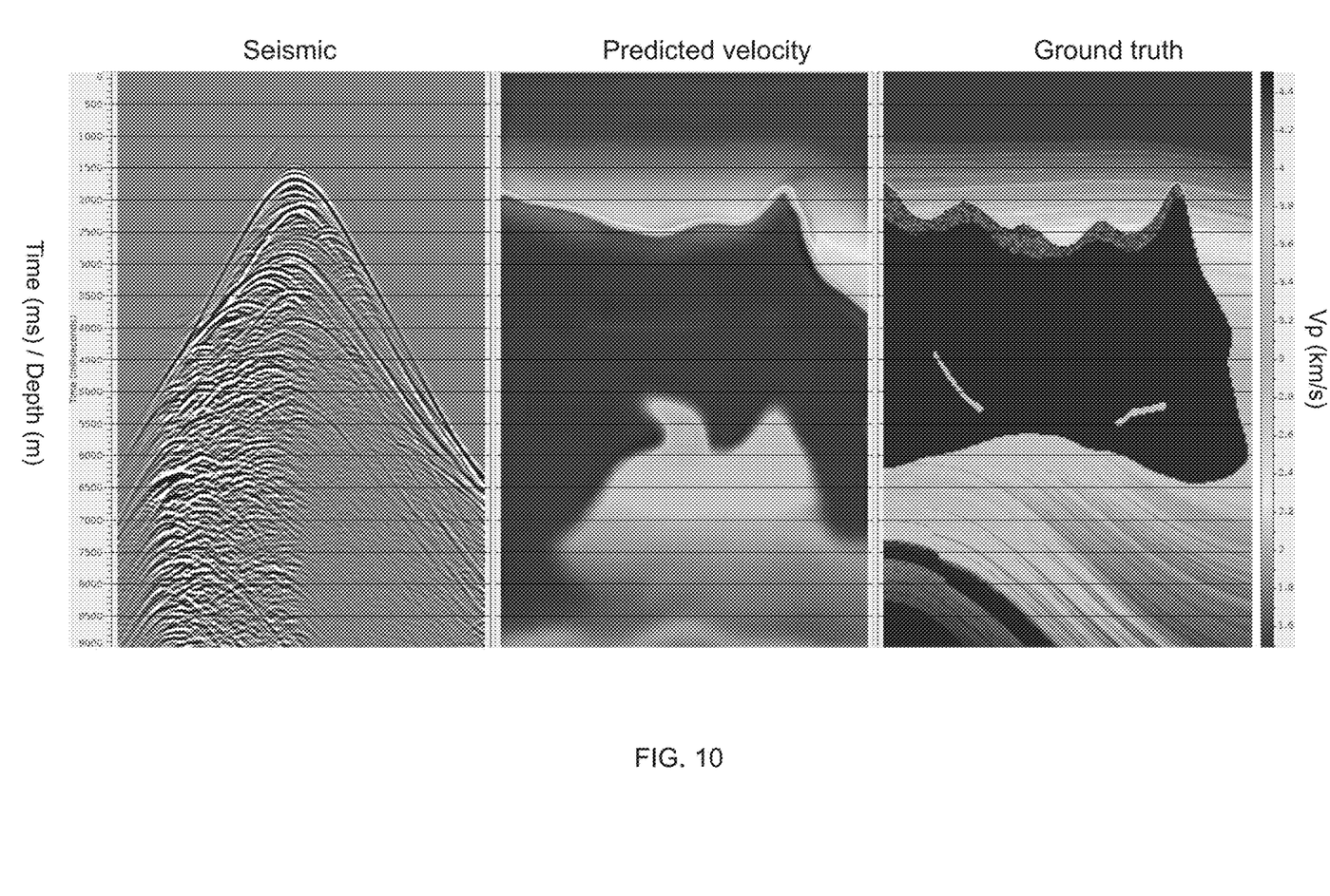
FIG. 10 demonstrates results of the present invention, in accordance with some embodiments.

Multi-scale feature extraction and attention mechanism can be applied in the Encoder-Decoder architecture to more efficiently disentangle global and local features and steer the network towards the most relevant information to velocity. Another alternative to 3D Encoder-Decoder that may lead to better regularity and sharper velocities is GAN (Generative Adversarial Network). FIG. 6 illustrates another possible embodiment, having separate encoders extracting high-level features from individual shots before merging the features in later layers, as opposed to mixing individual shots in the stem layer, may improve the effectiveness of high-level information communication among shots. If large shot group size is necessary for prediction accuracy, another alternative encoder is to treat shot X and Y indices as another two spatial dimensions and use 5D convolutions in the encoder to learn 5D features before collapsing to three-dimensional feature maps. The downside is that a 5D encoder would be extremely expensive to train in terms of computational cost and memory consumption.

Incorporating physical constraints in training is another option with part of the loss function characterizing the fidelity of physical correctness by simulating shots with forward modeling. Such an effort would be a lot more computationally expensive, though. Other optional inputs may be existing image or velocity model derived from conventional methods or a pre-trained neural network for shallow velocity only, which can be used as secondary input through a different encoder branch to drive the neural network towards more accurate estimation in more challenging deep sections than relying on seismic shot groups alone. Post processing that regulates the neural network output for more realistic velocity estimation can also be considered.

The logic in conventional velocity model building starts from easy shallow sediment velocity above salt bodies and goes deeper step by step to refine the salt geometry and subsalt sediments. It may be beneficial to design a series of neural networks that follow a similar multi-step, shallow-to-deep iterative processes to gradually derive velocities in deeper sections based on both the seismic data and the shallower velocity estimated from the previous step. The network used in the first step may differ from the subsequent ones as the first one only takes seismic as inputs before the first velocity model is predicted. Instead of estimating velocity within the entire depth range, the iterative process simplifies the task for the neural network within each step to only making incremental estimation in the next geologically confined depth range.

The Deep Neural Network may be trained, by way of example and not limitation, on Nvidia V100 GPUs. Data parallelism is employed to speed up training with 8 replicas of the model on 8 GPUs in a machine. For 3D Deep Learning models, GPU memory is usually a bottleneck. When high resolution velocity models that span the full depth range are needed, both the input sampling rate and the number of input shots increase, making it more challenging to train on a single GPU. Besides the mobile architecture ShuffleNetV2, another memory saving approach is to take advantage of model parallelism such as Mesh TensorFlow, offered in the Deep Learning framework TensorFlow that partitions the spatial dimensions of large volumes onto multiple GPUs to increase the amount of available memory resources.

Once the model is trained, it can be used with any appropriate 5D seismic dataset to predict a velocity model. As described previously, the seismic dataset can be arranged in shot gathers which can then be presented to the model which will predict a 3D velocity model within the shot gather aperture. This can be repeated for multiple shot gathers to generate multiple 3D velocity blocks.

In the inference stage, the consistency along velocity block boundaries requires that each block predicted individually to have an overlap region with its neighbors that partially share information from overlapping input shots. The final velocity model should be a concatenated one among adjacent velocity blocks with taper zones in between for smooth transition. To make sure that the network can learn generalizable relationship between shots and velocity, the velocity block should be confined to an area that can be well constrained by the input shot group. The current choice is the central half (25% area) of the central shot's receiver range, the shallow part of the velocity block should be well constraint by the multiple shots from above. The lateral extent of the velocity block can be extended with larger aperture with either more shots as inputs or larger shot spacing.

The current evaluation metric is the mismatch between predicted velocity and the known ground truth. Other possible metrics include moveout of migrated gathers, and comparison with results from conventional methods such as seismic tomography and full waveform inversion.

The present invention replaces conventional tomography. Conventional tomography requires at least weeks, often months, to generate a velocity model from seismic data. The present invention accomplishes this, in general, in least than a day. The velocity model can be used as an FWI initial model for further updates, or for seismic imaging (e.g., migration) in order to generate a seismic image that can be interpreted to identify subsurface geologic features including hydrocarbon reservoirs. FIGS. 7, 8, 9, and 10 illustrate examples of the trained model from method 100 being used for predicting velocity models for a synthetic seismic dataset (the synthetic seismic dataset is associated a "ground truth" velocity model). Each figure shows an exemplary seismic shot, the predicted velocity model, and the ground truth velocity model.

Figure 11:
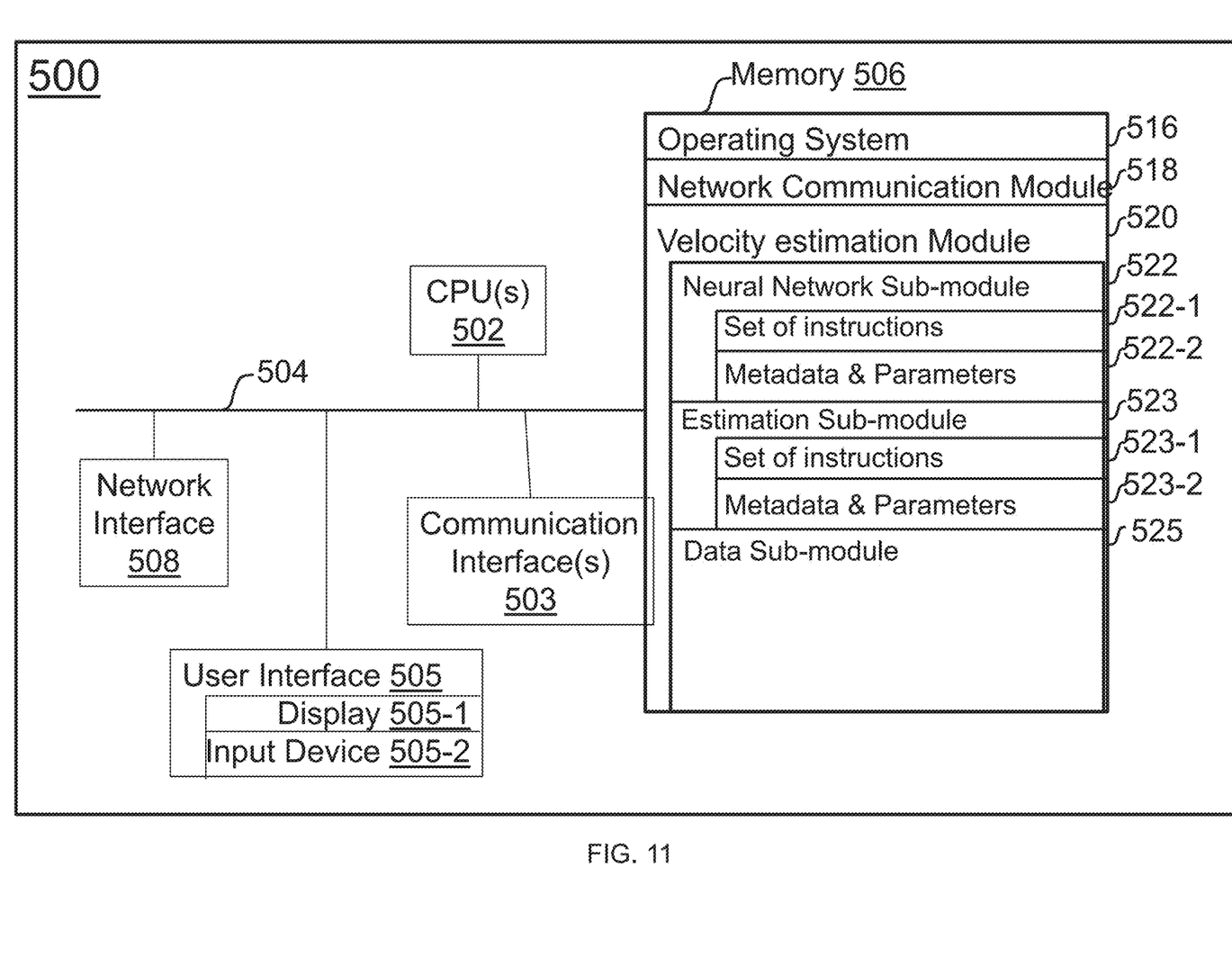
FIG. 11 is a block diagram illustrating a seismic velocity estimation system, in accordance with some embodiments.

FIG. 11 is a block diagram illustrating a seismic velocity estimation system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic velocity estimation system 500 includes one or more processing units (CPUs) 502, one or more network interfaces 508 and/or other communications interfaces 503, memory 506, and one or more communication buses 504 for interconnecting these and various other components. The seismic velocity estimation system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a velocity estimation module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the velocity estimation module 520 executes the operations of the present invention. Velocity estimation module 520 may include data sub-module 525, which handles the seismic dataset including seismic gathers. This seismic data is supplied by data sub-module 525 to other sub-modules.

Neural network sub-module 522 contains a set of instructions 522-1 and accepts metadata and parameters 522-2 that will enable it to build a neural network based on training data and may optionally condition the training data. The estimation sub-module 523 contains a set of instructions 523-1 and accepts metadata and parameters 523-2 that will enable it to estimate a velocity model using the neural network. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the velocity model. For example, any of the sub-modules may optionally be able to generate a display that would be sent to and shown on the user interface display 505-1. In addition, any of the seismic data, processed seismic data products, or velocity models may be transmitted via the communication interface(s) 503 or the network interface 508 and may be stored in memory 506.

The present invention is, optionally, governed by instructions that are stored in computer memory or a non-transitory computer readable storage medium (e.g., memory 506 in FIG. 11) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the present invention is described as being performed by a computer system, although in some embodiments, various operations of the present invention are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   a. receiving, at a computer processor, a 5D seismic dataset representative of a subsurface volume of interest and a 3D velocity model;
   b. preparing a subset of the 5D seismic dataset and a subset of the 3D velocity model to generate a training dataset;
   c. training a Deep Neural Network using the training dataset to generate a trained model;
   d. storing the trained model in computer memory or a non-transitory computer readable storage medium;
   e. receiving a second 5D seismic dataset;
   f. estimating a predicted velocity model using the trained model and a subset of the second 5D seismic dataset;
   g. performing seismic imaging of the second 5D seismic dataset using the predicted velocity model to generate a 3D seismic image; and
   h. interpreting subsurface geologic features in the 3D seismic image to design well paths and drilling strategies for hydrocarbon production.

2. The method of claim 1, wherein the preparing the subset of the 5D seismic dataset comprises:
   a. regularizing the subset of the 5D seismic dataset to generate a regularized subset;
   b. decimating the regularized subset to generate a decimated subset;
   c. mapping shots and seismic traces of the decimated subset onto a uniform grid; and
   d. forming shot clusters based on the shots and seismic traces on the uniform grid to generate the training seismic dataset.

3. The method of claim 2 wherein the subset of the 3D velocity model is selected based on the shot clusters' aperture.

4. The method of claim 1 wherein the Deep Neural Network is a 3D Encoder-Decoder or a Generative Adversarial Network.

5. The method of claim 1 further comprising repeating step f for a plurality of subsets of the second 5D seismic dataset and a plurality of subsets of the 3D velocity model; storing the predicted velocity model estimated by step f to a set of estimated velocity models; and concatenating the set of estimated velocity models to generate a whole 3D velocity model.

6. A computer system, comprising:
one or more processors;
memory; and
one or more programs, wherein the one or more programs are stored in the memory and configured to be executed by the one or more processors, the one or more programs including instructions that when executed by the one or more processors cause the system to:
 a. receive, at the one or more processors, a 5D seismic dataset representative of a subsurface volume of interest and a 3D velocity model;
 b. prepare a subset of the 5D seismic dataset and a subset of the 3D velocity model to generate a training dataset;
 c. train a Deep Neural Network using the training dataset to generate a trained model;
 d. store the trained model in the memory or a non-transitory computer readable storage medium;
 e. receive a second 5D seismic dataset;
 f. estimate a predicted velocity model using the trained model and a subset of the second 5D seismic dataset;
 g. perform seismic imaging of the second 5D seismic dataset using the predicted velocity model to generate a 3D seismic image; and
 h. interpret subsurface geologic features in the 3D seismic image to design well paths and drilling strategies for hydrocarbon production.

7. The system of claim 6, wherein the preparing the subset of the 5D seismic dataset comprises:
 a. regularizing the subset of the 5D seismic dataset to generate a regularized subset;
 b. decimating the regularized subset to generate a decimated subset;
 c. mapping shots and seismic traces of the decimated subset onto a uniform grid; and
 d. forming shot clusters based on the shots and seismic traces on the uniform grid to generate the training seismic dataset.

8. The system of claim 7 wherein the subset of the 3D velocity model is selected based on the shot clusters' aperture.

9. The system of claim 6 wherein the Deep Neural Network is a 3D Encoder-Decoder or a Generative Adversarial Network.

10. A non-transitory computer readable storage medium storing one or more programs, the one or more programs comprising instructions, which when executed by an electronic device with one or more processors and memory, cause the device to:
 a. receive, at the one or more processors, a 5D seismic dataset representative of a subsurface volume of interest and a 3D velocity model;
 b. prepare a subset of the 5D seismic dataset and a subset of the 3D velocity model to generate a training dataset;
 c. train a Deep Neural Network using the training dataset to generate a trained model;
 d. store the trained model in the memory or a non-transitory computer readable storage medium;
 e. receive a second 5D seismic dataset;
 f. estimate a predicted velocity model using the trained model and a subset of the second 5D seismic dataset;
 g. perform seismic imaging of the second 5D seismic dataset using the predicted velocity model to generate a 3D seismic image; and
 h. interpret subsurface geologic features in the 3D seismic image to design well paths and drilling strategies for hydrocarbon production.

11. The non-transitory computer readable storage medium of claim 10, wherein the preparing the subset of the 5D seismic dataset comprises:
 a. regularizing the subset of the 5D seismic dataset to generate a regularized subset;
 b. decimating the regularized subset to generate a decimated subset;
 c. mapping shots and seismic traces of the decimated subset onto a uniform grid; and
 d. forming shot clusters based on the shots and seismic traces on the uniform grid to generate the training seismic dataset.

12. The device of claim 10 wherein the subset of the 3D velocity model is selected based on the shot clusters' aperture.

13. The non-transitory computer readable storage medium of claim 10, wherein the Deep Neural Network is a 3D Encoder-Decoder or a Generative Adversarial Network.

* * * * *